W. F. KOENIG.
LICENSE HOLDER.
APPLICATION FILED SEPT. 25, 1914.

1,223,700.

Patented Apr. 24, 1917.
2 SHEETS—SHEET 1.

Witnesses
G. F. Rudolph
H. O. Parker

Inventor
Walter F. Koenig,
By Victor J. Evans
Attorney

W. F. KOENIG.
LICENSE HOLDER.
APPLICATION FILED SEPT. 25, 1914.

1,223,700.

Patented Apr. 24, 1917.
2 SHEETS—SHEET 2.

Inventor
Walter F. Koenig
By Victor J. Evans
Attorney

Witnesses

UNITED STATES PATENT OFFICE.

WALTER F. KOENIG, OF WILTON JUNCTION, IOWA.

LICENSE-HOLDER.

1,223,700.     Specification of Letters Patent.     Patented Apr. 24, 1917.

Application filed September 25, 1914. Serial No. 863,544.

*To all whom it may concern:*

Be it known that I, WALTER F. KOENIG, a citizen of the United States, residing at Wilton Junction, in the county of Muscatine and State of Iowa, have invented new and useful Improvements in License-Holders, of which the following is a specification.

The invention relates to a license holder, and more particularly to the class of illuminated display devices for automobile or license numbers.

The primary object of the invention is the provision of a device of this character wherein the license plate can be conveniently held with relation to a lamp on an automobile so that the light from the said lamp will serve to illuminate the license number whereby it may be conveniently and visually inspected while the automobile is in motion or at a standstill.

Another object of the invention is the provision of a device of this character wherein the construction thereof is of novel form and is made up of interchangeable parts so that the said device can be mounted at the rear or front of the automobile and at any side of the head or tail lights so that the license number can be illuminated therefrom.

A further object of the invention is the provision of a device of this character which is extremely simple in construction, readily and easily mounted in proper position with respect to the head or tail lights on an automobile, thoroughly reliable and efficient in its purpose, and inexpensive in manufacture.

With these and other objects in view, the invention consists in the construction, combination and arrangement of parts as will be hereinafter fully described, illustrated in the accompanying drawings, and pointed out in the claims hereunto appended.

In the drawings:—

Similar reference characters indicate corresponding parts throughout the several views in the drawings.

Figure 1:
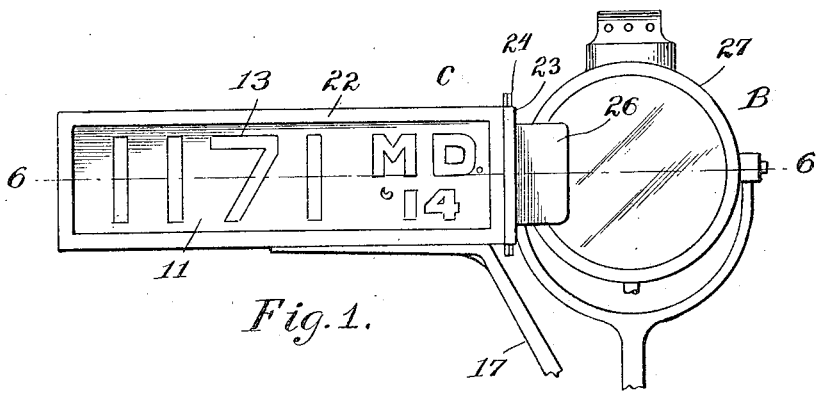
Figure 1 is a front elevation of a headlight of an automobile with the device constructed in accordance with the invention applied.
Figure 2:
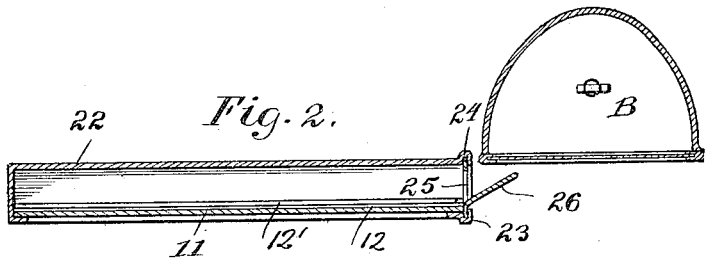
Fig. 2 is a sectional view on the line 6—6 of Fig. 1.

Referring to the drawings in detail, especially Fig. 1 thereof, A designates generally an automobile of any ordinary well-known type, B the head or front lights, which are supported and mounted on the frame or truck of the automobile in the usual well-known manner, and said lights are of the ordinary well-known construction, while associated with one of the head or front lights is the device C hereinafter fully described.

The device C comprises a rectangular shaped casing or body 22 preferably made from metal formed with an open front and end respectively, the front opening being covered through the medium of a panel or plate 11 which engages in guideways 12 to permit the removal thereof through the open end when desired, said guideways being formed by the angle bars 12' mounted upon the top and bottom walls of the casing and being arranged adjacent the front wall of the casing. The plate is formed with transparent indicia 13 providing the automobile or license number, the State granting the same, and the year in which the license has been issued.

The casing or body 22 is mounted on the body of the automobile in any suitable manner and has adjustably connected thereto a brace 17 which rigidly supports the same when in position relative to one of the head or front lamps B, the brace 17 being connected to the frame or truck of the automobile in any suitable manner.

The body or casing 22 has detachably connected to its open end by slidably engaging the guides 23 a slide 24 formed with an elongated opening 25 from one longer edge of which projects a bendable shuttle or wing 26, the latter being extended over the front of the lamp 27 so that a portion of the light therefrom will be deflected within the casing or body 22 for illuminating the license plate therein. It will be noted from the foregoing construction that the transparent panel 11 is first inserted into the casing 22 whereupon a slide 24 is placed within the guides 23, the slide engaging one end of the panel 11 thereby locking the panel within the casing as will be understood.

Figure 3:
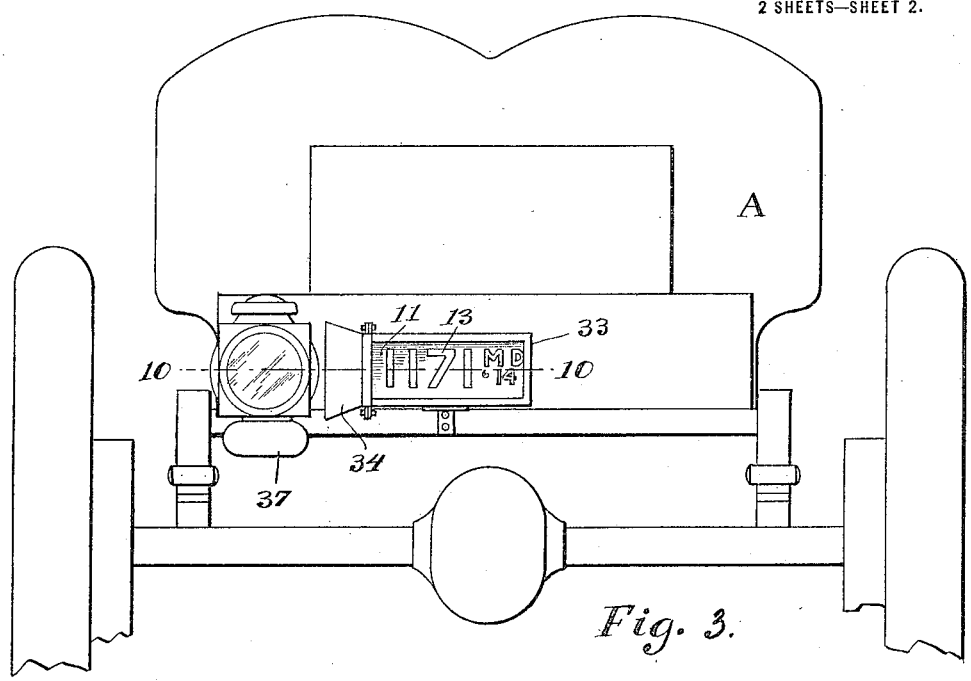
Fig. 3 is a rear elevation of an automobile, showing a modification of the device applied and in relative position to the taillight.
Figure 4:
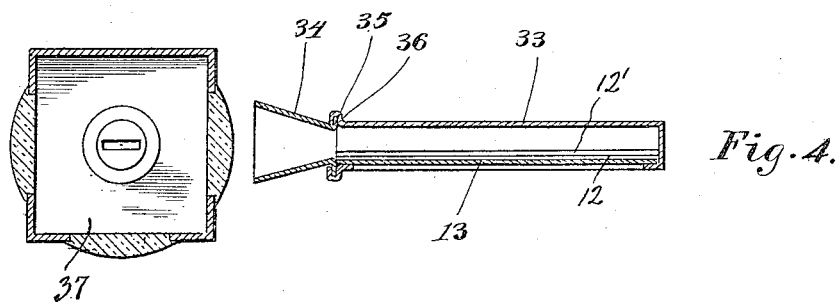
Fig. 4 is a sectional view on the line 10—10 of Fig. 3.

In Figs. 3 and 4 respectively there is shown a further modification of the invention wherein the casing or body 33 has detachably connected at its open end a funnel-shaped light entrance hood 34 which is carried upon a slide 35 engaging the guides 36 formed at the open end of the body or casing, and this hood 34 has its outer wider end facing the light exposing side of the lamp 37, which in this instance is the tail lamp of the automobile, so that the light therefrom will be admitted directly into the body or casing 33 for illuminating purposes, as heretofore set forth, the casing or body 33 being supported at the rear end of the automobile in any suitable manner. As in the other forms, the light from the lamp 37 is adapted to be projected through the transparent panel 13, the panel being locked within the casing by means of a slide 35 as will be understood.

Figure 5:
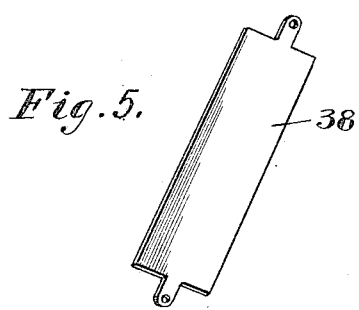
Fig. 5 is a perspective view of the cutoff slide.
Figure 6:
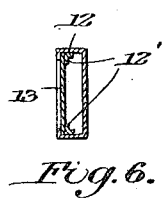
Fig. 6 is a transverse section of Fig. 1.

In Fig. 5 there is shown a closure slide 38 which can be mounted in the guides at the open end of the casing or body of the device for closing said open end should it be desired to shut off the light from the lamp, either at the front or rear of the automobile, it being understood that the hood or light deflector is to be first removed to permit the insertion of the slide 38.

It will be apparent that the device, by reason of the interchangeable parts, can be mounted in operative relation to the head or front lights at the front of the automobile, or in operative relation to the tail light at the rear of the automobile so that the license number can be illuminated for the visual display thereof, thus enabling it to be conveniently inspected or read during the travel of the automobile or when the same is at a standstill.

From the foregoing description, taken in connection with the accompanying drawings, it is thought that the construction of the device will be clearly understood, and therefore a more extended explanation has been omitted.

What is claimed is:—

1. A license device for lamps comprising a hollow body open at one end and side, a lamp arranged adjacent the open end of the body, a transparent panel mounted in said body and closing the open side thereof, and a light deflector detachably mounted in said body at the open end thereof and contacting with said panel whereby the panel will be locked within said body.

2. A license device for lamps comprising a hollow body open at one end and side, a lamp arranged adjacent the open end of said body, guides formed in said body at the open end thereof, a transparent panel in said body and having one end thereof disposed adjacent one of said guides and a light deflector mounted in said guides and contacting with said panel whereby the latter may be locked within said body.

In testimony whereof I affix my signature in presence of two witnesses.

WALTER F. KOENIG.

Witnesses:
 WALTER RANEY,
 HELLEN BILLINGS.

Copies of this patent may be obtained for five cents each, by addressing the "Commissioner of Patents, Washington, D. C."